(12) United States Patent
Chung

(10) Patent No.: US 12,087,932 B2
(45) Date of Patent: Sep. 10, 2024

(54) SECONDARY BATTERY ELECTRODE PRODUCTION SYSTEM

(71) Applicant: YOUILET CO., LTD., Gyeonggi-do (KR)

(72) Inventor: Youn Gil Chung, Gyeonggi-do (KR)

(73) Assignee: YOUILET CO., LTD., Gyeonggi-do (KR)

( * ) Notice: Subject to any disclaimer, the term of this patent is extended or adjusted under 35 U.S.C. 154(b) by 858 days.

(21) Appl. No.: 17/268,703

(22) PCT Filed: Jan. 9, 2019

(86) PCT No.: PCT/KR2019/000339
§ 371 (c)(1),
(2) Date: Feb. 16, 2021

(87) PCT Pub. No.: WO2020/045772
PCT Pub. Date: Mar. 5, 2020

(65) Prior Publication Data
US 2021/0234145 A1    Jul. 29, 2021

(30) Foreign Application Priority Data
Aug. 29, 2018   (KR) .................. 10-2018-0102185

(51) Int. Cl.
*H01M 4/04*    (2006.01)
*B26D 7/06*    (2006.01)
(Continued)

(52) U.S. Cl.
CPC ............... *H01M 4/04* (2013.01); *B26D 7/06* (2013.01); *B26D 7/32* (2013.01); *B26D 9/00* (2013.01); *B26F 1/44* (2013.01)

(58) Field of Classification Search
CPC ...... B21D 28/10; B21D 28/22; B21D 35/001; B26F 1/12; B26F 1/14; B26F 1/44; B26D 9/00
See application file for complete search history.

(56) References Cited

U.S. PATENT DOCUMENTS 4,674,310 A * 6/1987 Ginzburg ............... G01B 7/345
73/159
4,745,790 A * 5/1988 Teshiba ................... B21B 37/68
72/247

(Continued)

FOREIGN PATENT DOCUMENTS

CN   1387277 A   12/2002
CN   1633728 A   6/2005

(Continued)

OTHER PUBLICATIONS

International Search Report from corresponding PCT Application No. PCT/KR2019/000339, dated May 27, 2019.

(Continued)

*Primary Examiner* — Edward T Tolan
(74) *Attorney, Agent, or Firm* — Harness, Dickey & Pierce, P.L.C.

(57) ABSTRACT

The present invention relates to a secondary battery electrode production system. The secondary electrode production system according to the present invention comprises: an unwinding portion (100) having multiple electrode material supply reels so as to continuously supply an electrode material; a notching portion (200) disclosed on a path of movement of the electrode material supplied from the unwinding portion (100); a cutting portion (400) disposed on the path of movement of the electrode material supplied from the notching portion (200) so as to generate the electrode; a vision inspection portion (600) for confirming whether the electrode is acceptable or not; and an electrode (Continued)

discharge portion (800) comprising a magazine for aligning and storing the electrode while interworking with the vision inspection portion.

6 Claims, 13 Drawing Sheets

(51) Int. Cl.
*B26D 7/32* (2006.01)
*B26D 9/00* (2006.01)
*B26F 1/44* (2006.01)

(56) References Cited

U.S. PATENT DOCUMENTS

| | | | |
|---|---|---|---|
| 11,594,713 B2 * | 2/2023 | Woo | F26B 3/30 |
| 2013/0247637 A1 * | 9/2013 | Min | H01M 4/0404 |
| | | | 72/184 |

FOREIGN PATENT DOCUMENTS

| | | | |
|---|---|---|---|
| CN | 102644059 A | | 8/2012 |
| CN | 103227313 A | | 7/2013 |
| CN | 104885289 A | | 9/2015 |
| CN | 106067525 A | | 11/2016 |
| CN | 106003246 B | * | 2/2018 |
| CN | 107706464 A | | 2/2018 |
| JP | 2000-094505 A | | 4/2000 |
| KR | 10-1271492 B1 | | 6/2013 |
| KR | 20130073294 A | * | 7/2013 |
| KR | 10-2013-0102997 A | | 9/2013 |
| KR | 10-1479724 B1 | | 1/2015 |
| KR | 10-2016-0133264 A | | 11/2016 |
| KR | 101726780 B1 | * | 4/2017 |
| KR | 10-1819729 B1 | | 3/2018 |
| KR | 10-1874281 B1 | | 7/2018 |

OTHER PUBLICATIONS

Office Action from corresponding Chinese Patent Application No. 201980056919.3, dated Feb. 19, 2024.
Notice of Allowance from corresponding Chinese Patent Application No. 201980056919.3, dated Jun. 27, 2024.

* cited by examiner

SECONDARY BATTERY ELECTRODE PRODUCTION SYSTEM

CROSS-REFERENCE TO RELATED APPLICATIONS

This application is a national phase application of PCT Application No. PCT/KR2019/000339, filed on Jan. 9, 2019, which claims benefit of Korean Patent Application 10-2018-0102185, filed on Aug. 29, 2018. The entire disclosure of the applications identified in this paragraph are incorporated herein by references.

FIELD

The present invention relates to a secondary battery electrode production system, and more particularly, to a secondary battery electrode production system capable of improving productivity of a secondary battery electrode.

BACKGROUND

In general, a chemical battery refers to a battery composed of a positive electrode, a negative electrode, and an electrolyte to thus generate electrical energy using a chemical reaction, and is classified into a primary battery, which is disposable, and a secondary battery, which is chargeable and dischargeable, thus enabling repeated use.

Meanwhile, the use of a secondary battery is gradually increasing due to the advantage of its chargeable and dischargeable characteristic. Among such secondary batteries, a lithium secondary battery has high energy density per unit weight, and thus is widely used as a power source in electronic communication devices and in high-power hybrid vehicles.

In addition, electrodes used in such a secondary battery are used as positive and negative electrodes of the battery, and are used to electrically connect the battery to the outside of the battery.

Here, the electrodes are produced through a process of notching and cutting an electrode material on which electrode tabs are formed at regular intervals. The cut electrodes are loaded and stored in a magazine. In order to store the electrodes in the magazine, it is necessary to attract the cut electrodes and transfer them to the magazine.

As such, the process of producing electrodes of the secondary battery through notching and cutting an electrode material proceeds successively, and there is a great need to improve productivity in the notching process and the process of discharging the electrodes to the magazine.

In addition, electrodes used in such a secondary battery are used as positive and negative electrodes of the battery, and are used to electrically connect the battery to the outside of the battery.

Here, the electrodes are produced through a process of notching and cutting an electrode material on which electrode tabs are formed at regular intervals. The cut electrodes are loaded and stored in a magazine. In order to store the electrodes in the magazine, it is necessary to attract the cut electrodes and transfer them to the magazine.

As such, the process of producing electrodes of the secondary battery through notching and cutting an electrode material proceeds successively, and there is a great need to improve productivity in the notching process and the process of discharging the electrodes to the magazine.

(Patent Document 1) Korean Registered Patent Publication No. KR 10-1271492 (30 May 2013)

TECHNICAL PROBLEM

The present invention has been made to solve the foregoing problems of the prior art and therefore an object of the invention is to provide a secondary battery electrode production system capable of improving productivity by operating a mold in an upward and downward manner during a notching process and including an electrode discharge portion including a plurality of magazines.

TECHNICAL SOLUTION

A secondary battery electrode production system for producing a secondary battery electrode according to an embodiment of the present invention includes: an unwinding portion 100 having multiple electrode material supply reels so as to continuously supply an electrode material; a notching portion 200 disclosed on a path of movement of the electrode material supplied from the unwinding portion 100; a cutting portion 400 disposed on the path of movement of the electrode material supplied from the notching portion 200 so as to generate the electrode; a vision inspection portion 600 for confirming whether the electrode is acceptable or not; and an electrode discharge portion 800 including a magazine for aligning and storing the electrode while interworking with the vision inspection portion, wherein the notching portion 200 includes: a mold upper plate 201 disposed above the electrode material; a mold lower plate 202 disposed below the electrode material; and a driving portion 203 connected to the mold upper plate 201 and the mold lower plate 202, respectively, the driving portion 203 comprising a servomotor and a power transfer member for transferring power from the servomotor to the mold upper plate 201 and the mold lower plate 202, thereby simultaneously operating the mold upper plate 201 and the mold lower plate 202 upwards/downwards. Accordingly, an electrode tab can be formed by notching the electrode material.

In the secondary electrode production system according to an embodiment of the present invention, a line position control (LPC) sensor for detecting an electrode coating line for a notching process formed on the electrode material supplied from the unwinding portion may be provided to adjust positions of the multiple electrode material supply reels.

The secondary electrode production system according to an embodiment of the present invention may include an LPC meandering control means for detecting the electrode coating line for a notching process formed on the electrode material supplied from the unwinding portion and an edge of the electrode tab formed by the notching portion, thereby allowing the electrode material to move along the predetermined path of movement.

The LPC meandering control means may include the LPC sensor disposed between the unwinding portion and the notching portion and configured to detect the electrode coating lines for a notching process formed on the electrode material supplied from the unwinding portion, a plurality of guide rollers for guiding the electrode material to move along the predetermined path of movement, and a dancer roll which is moved left and right by a horizontal cylinder so as to interact with the plurality of guide rollers to adjust tension of the electrode material.

In the secondary electrode production system according to an embodiment of the present invention, when the dancer roll is moved by an operation of the horizontal cylinder and thus a distance between the dancer roll and the plurality of guide rollers is adjusted, a distance the electrode member travels through the plurality of guide rollers may be adjusted, thereby controlling the tension of the electrode material continuously supplied.

The dancer roll may be disposed at a rear end of the LPC meandering control means 300 in the case of a material requiring reactivity of the electrode material, and may be installed at a front end of the LPC meandering control means 300 in the case of a material which prioritizes meandering of the electrode material.

The electrode discharge portion 800 may have a plurality of magazines for aligning and storing the acceptable secondary battery electrodes while interworking with the vision inspection portion 600, and the plurality of magazines may be automatically replaced with each other to store the acceptable electrodes without stopping the electrode production system.

The plurality of magazines constituting the electrode discharge portion 800 may include a first magazine and a second magazine in a two-row structure, and each of the first and second magazines may include a push portion for discharging the acceptable secondary battery electrode determined and supplied by the vision inspection portion 600 to a lower side; a loading magazine in which the acceptable electrode discharged by the push portion is loaded; and a magazine conveyor for transferring the loading magazine in a direction perpendicular to a supply direction of the acceptable electrode.

In the electrode discharge portion 800, a predetermined number of the acceptable secondary battery electrodes may be loaded into the loading magazine of the first magazine that is moved by the magazine conveyor to a position where the acceptable secondary battery electrodes discharged to the lower side by the push portion can be loaded, and when a predetermined number of the acceptable electrodes are loaded into the loading magazine of the first magazine in a state where the second magazine is on standby, the second magazine may be moved by the magazine conveyor to a position where the acceptable electrodes discharged to the lower side by the push portion can be loaded and the first magazine may be moved by the magazine conveyor to a position where the corresponding loading magazine is replaced with a new magazine, such that the first and second magazines are automatically replaced with each other in order to store the acceptable electrodes without interrupting production of the secondary battery electrodes, and thereby the acceptable electrodes may be loaded into a corresponding loading magazine of the second magazine and the first magazine may be provided with the new magazine and be on standby.

ADVANTAGEOUS EFFECTS

As described above, the present invention has an effect of providing a secondary battery electrode production system capable of improving productivity by operating a mold in an upward and downward manner during a notching process and including an electrode discharge unit having a plurality of magazines.

In addition, in the present invention, in the case of a material requiring reactivity of the electrode material, a dancer roll is disposed at the rear end of a line position control (LPC) meandering control means, and in the case of a material that prioritizes meandering of the electrode material, the dancer roll is installed at the front end of the LPC meandering control means. Thus, there is an effect of increasing productivity by actively dealing with each electrode material.

Further, in the present invention, an electrode discharge portion having a plurality of magazines is included, whereby the production process of secondary battery electrodes is prevented from being interrupted during the replacement of magazine, and thus it is possible to produce secondary battery electrodes at high speed.

MODE FOR INVENTION

Hereinafter, preferred embodiments of the present invention will be described in detail with reference to the accompanying drawings.

The invention may, however, be embodied in many different forms and should not be construed as being limited to the embodiments set forth herein; rather these embodiments are provided so that this disclosure will be thorough and complete, and will fully convey the concept of the invention to one of ordinary skill in the art.

The terminology used herein is for the purpose of describing particular embodiments only and is not intended to be limiting of the present invention.

As used herein, the singular forms "a," "an" and "the" are intended to include the plural forms as well, unless the context clearly indicates otherwise. It will be further understood that the terms "comprises" and/or "comprising" used herein specify the presence of stated features, integers, steps, operations, members, components, and/or groups thereof, but do not preclude the presence or addition of one or more other features, integers, steps, operations, members, components, and/or groups thereof. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Embodiments of the present invention are described herein with reference to drawings that are schematic illustrations of idealized embodiments of the invention. As such, variations from the shapes of the drawings as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

A secondary battery electrode production system according to the present invention is an apparatus for automatically and continuously producing electrodes used for a secondary battery.

Figure 1:
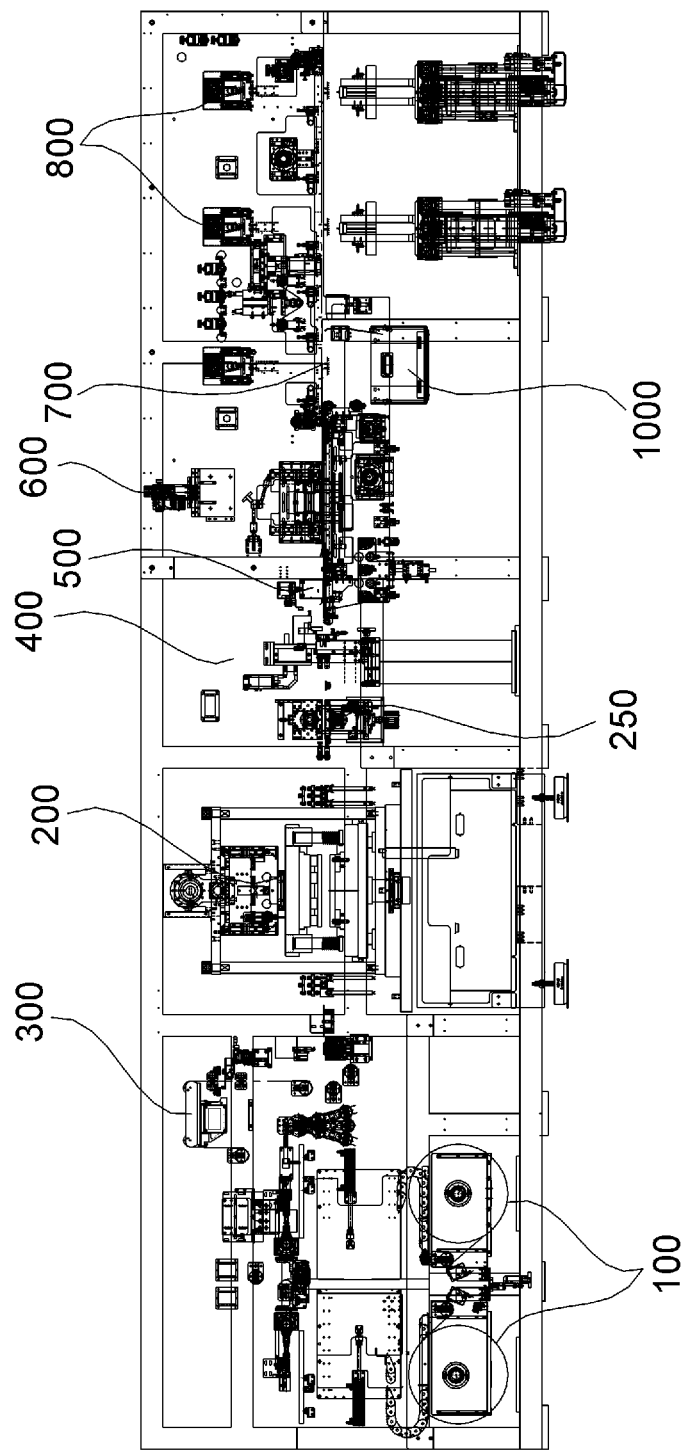
FIG. 1 is a front view of a secondary battery electrode production system for according to an embodiment.

FIG. 1 is a front view of a secondary battery electrode production system for according to an embodiment.

FIG. 1 is a front view of a secondary battery electrode production system for according to an embodiment.

As illustrated in FIG. 1, the secondary battery electrode production system according to an embodiment is a system including an unwinding portion 100, a notching portion 200, a feeding portion 250, a cutting portion 400, a cleaning portion 500, a vision inspection portion 600, and a discharge portion 700, wherein when an electrode material S formed as a horizontally-elongated strip-shaped metal plate is supplied from the unwinding portion 100 on an inlet side, electrode tabs Sb are formed on the electrode material S by the notching portion 200, the electrode material (S) on which the electrode tabs (Sb) are formed is automatically cut to the required size for a product through the cutting portion, so that individual electrodes Sa for a secondary battery are produced through the discharge portion 700 on an outlet side, and thereafter the individual electrodes Sa are automatically aligned and loaded in a magazine provided in the discharge portion 700. Here, the horizontally elongated strip-shaped metal plate formed as the electrode material S may be formed of copper when a battery using a negative electrode is produced, and may be formed of aluminum when a battery using a positive electrode is produced.

Figure 2:
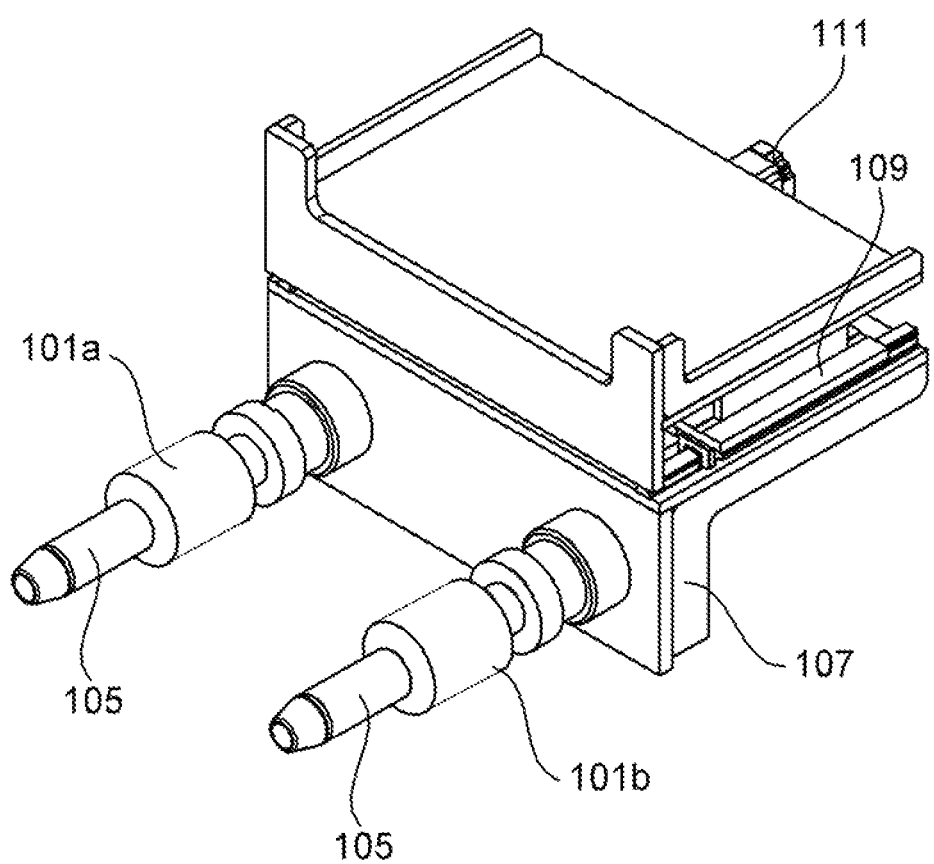
FIG. 2 is a schematic perspective view of an unwinding portion of FIG. 1.
Figure 3:
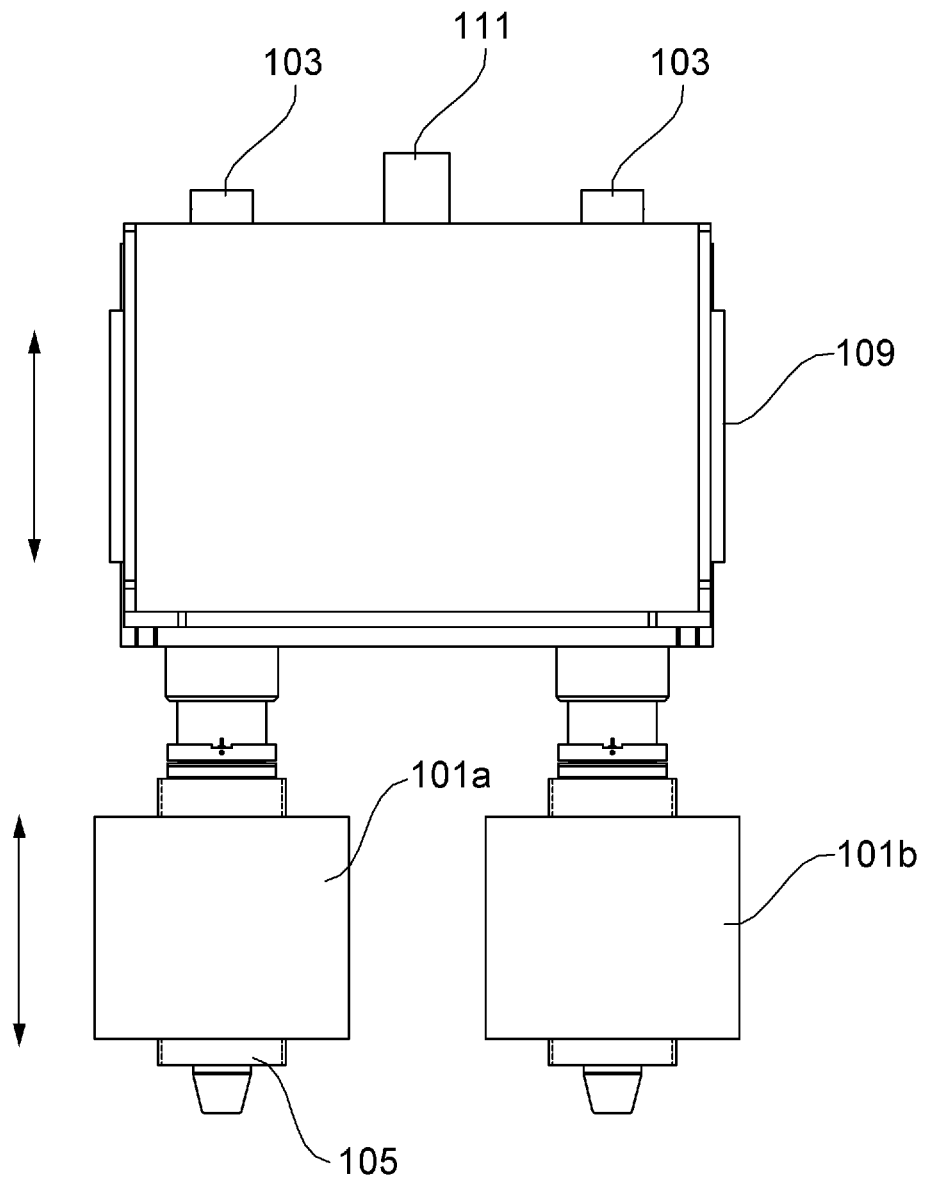
FIG. 3 is a schematic plan view of the unwinding portion of FIG. 1.

FIG. 2 is a schematic perspective view of the unwinding portion of FIG. 1, and FIG. 3 is a schematic plan view of the unwinding portion of FIG. 1.

As shown in FIGS. 1 to 3, the unwinding portion 100 continuously supplies an electrode material S formed as a strip-shaped metal plate.

The unwinding portion 100 includes a plurality of electrode material supply reels and a servo motor 103 to continuously supply the electrode material S from the plurality of electrode material supply reels.

The plurality of electrode material supply reels each wind and store the electrode material S in the form of a roll, and are composed of a first electrode material supply reel 101a and a second electrode material supply reel 101b. In addition, the plurality of electrode material supply reels may be configured as two or more reels as necessary.

The servo motor 103 drives each of the first and second electrode material supply reels 101a and 101b so that the stored electrode material S is supplied.

In addition, the unwinding portion 100 further includes a mechanical chuck 105, a frame 107, a linear motion (LM) guide block 109, and a servo motor 111 for an LM guide block to adjust the positions of the first and second electrode material supply reels 101a and 101b according to the size of the secondary battery electrode.

In this case, the frame 107 supports the first and second electrode material supply reels 101a and 101b. In addition, the LM guide block 109 is driven by the servo motor 111 for the LM guide block to move the frame 107 back and forth around a rotational axis of the mechanical chuck 105. Further, the servo motor 111 for the LM guide block applies forward or reverse rotational force to drive the LM guide block 109. In addition, the electrode material S is wound in the form of a roll on each of the first and second electrode material supply reels 101a and 101b by the rotation of the mechanical chuck 105 driven by the servo motor 103.

In addition, the unwinding portion 100 drives the servo motor 103 to continuously supply the electrode material S of the second electrode material supply reel 101b, and the first electrode material supply reel 101a is on standby for use as a back-up supply. When all of the electrode material (S) of the second electrode material supply reel 101b is supplied, the unwinding portion 100 replaces the supplied electrode material (S) to continuously supply the electrode material S of the first electrode material supply reel 101a. The second electrode material supply reel 101b, which winds and stores again the electrode material S, is on standby for use as a back-up supply.

In addition, the unwinding portion 100 includes a first guide roller 121a, a second guide roller 121b, a first suction plate 131a and a second suction plate 131b, and a first electrode material exhaustion sensor 141a, and a second electrode material exhaustion sensor 141b, and sequentially cuts and bonds the corresponding electrode material according to the sensing of the first and second electrode material exhaustion sensors 141a and 141b, so that the electrode material supplied is automatically replaced without stopping the electrode production system, thereby enabling the immediate continuous supply of the electrode material. Here, shown reference numeral 151 denotes a guide roller that guides the electrode material S supplied from the unwinding portion 100 to move along a predetermined path of movement.

The first guide roller 121a guides the electrode material S supplied from the first electrode material supply reel 101a to move along a predetermined path of movement. In addition, the second guide roller 121b guides the electrode material S supplied from the second electrode material supply reel 101b.

The unwinding portion 100 automatically replaces the supplied electrode material through unwinder automatic slicing, thereby immediately and continuously supplying the electrode material S. However, the present invention is not limited thereto, and the electrode material may be manually replaced. The unwinding portion 100 may include a clamping means that automatically fixes an end of the electrode material S during the replacement of the electrode material S. Here, the unwinding portion 100 may not include the clamping means, but, instead, may include, although not illustrated, a supply buffer portion (not shown) to continue to consistently supply the electrode material S when the electrode material is automatically replaced (when unwinder automatic splicing is performed). In this case, the supply buffer portion may be, for example, a meandering control means that includes a plurality of guide rollers for guiding the electrode material S to move in a meandering fashion and is thus configured to guide the electrode material S to move along a predetermined path of movement.

The electrode material is wound around the guide rollers by adjusting the positions and number of guide rollers and the electrode material to be supplied to the next stage is adjusted to have an extra length, so that the electrode material can be replaced without affecting the electrode material supplied to the next stage during the replacement.

In addition, the unwinding portion 100 may include a means disposed on an upper part of the rear side thereof for guiding the electrode material S supplied from the plurality of electrode material supply reels to move along a predetermined path of movement, and for adjusting tension of the electrode material S. Additionally, the unwinding portion 100 may apply punching oil to an electrode material for a positive electrode of a battery. Further, the unwinding portion 100 is provided with a guide roll to move the electrode material S.

Figure 4A:
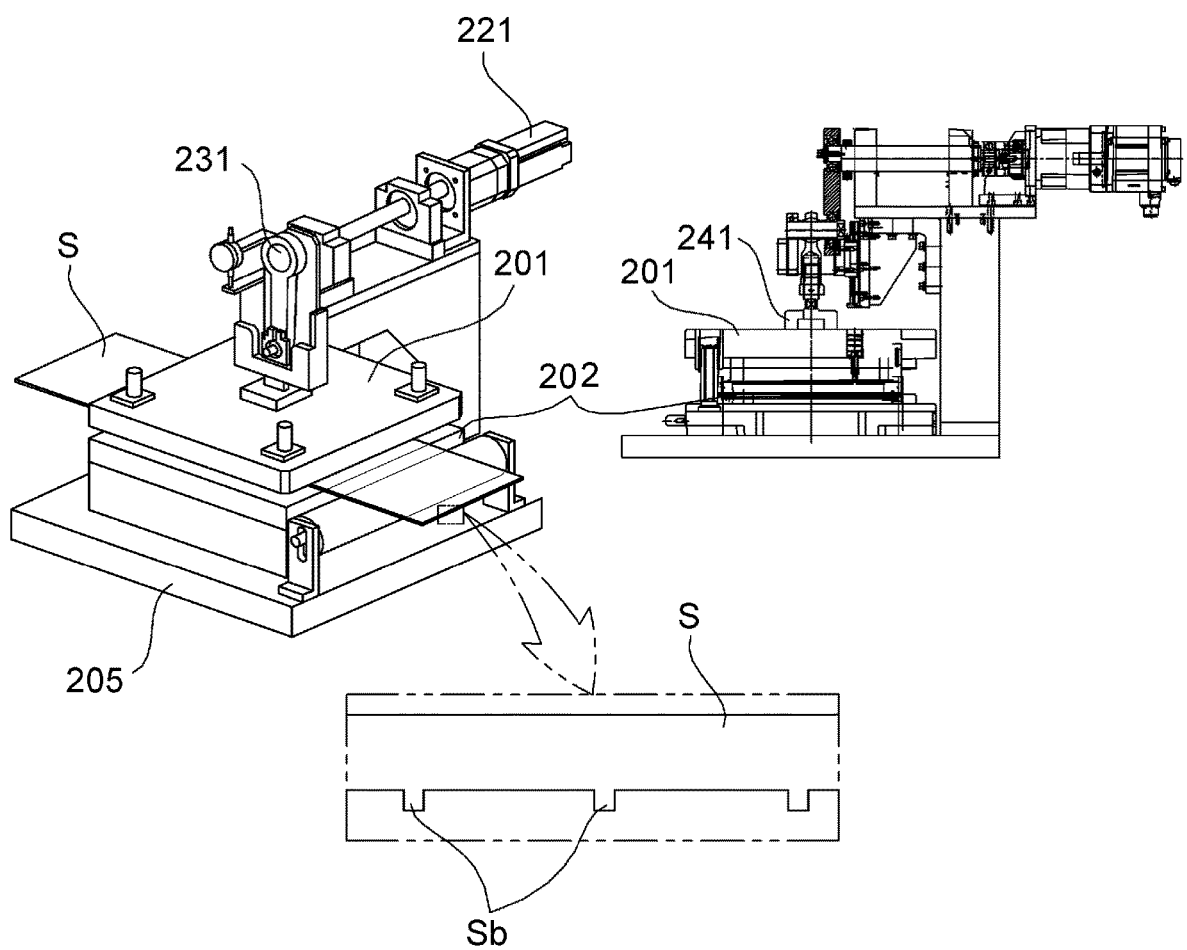
FIG. 4A is a schematic diagram illustrating a first embodiment of the notching portion shown in FIG. 1.

FIG. 4A is a schematic diagram illustrating a first embodiment of the notching portion shown in FIG. 1. As shown in FIGS. 1 and 4A, the notching portion 200 includes a mold upper plate 201, a mold lower plate 202, a notching servo motor 221 for moving the mold upper plate 201 upwards and downwards, and a mold fixing lower plate 205 to which the mold lower plate 202 is mounted. Here, the notching servo motor 221 may be disposed to be higher than the mold fixing lower plate 205 in order to move the mold upper plate 201 up and down through the crankshaft 231 relative to the mold fixing lower plate 205 to which the mold lower plate 202 is fixed.

As described above, in the secondary battery electrode production system according to an embodiment, the notching servo motor 221 drives only the mold upper plate 201 to perform the notching process, and thus the secondary battery electrode can be produced at high speed as the notching process is easier than the prior art in which a notching servo motor drives the entire heavy mold fixing upper plate to which a mold upper plate is mounted.

In addition, in the notching portion 200, the electrode material S supplied from the unwinding portion 100 passes between the mold upper plate 201 and the mold lower plate 202, and in the process of passing between the plates, the notching servo motor 221 operates to move the mold upper plate 201 downward and the electrode material S is notched with respect to the mold lower plate 202 of the mold fixing lower plate 205 to produce an electrode tab Sb. Here, the notching portion 200 forms notches in the electrode material S at regular intervals to form electrode tabs Sb protruding to one side.

Further, the notching portion 200 further includes a shank member that connects the mold upper plate 201 and the notching servo motor 221. In this case, although not illustrated, a noise-proof member, such as urethane, is disposed in an inner portion of the shank member 241. Due to this, when the mold upper plate 201 is moved up and down by the notching servo motor 221 and when the mold upper plate 201 is moved downward and the electrode material S is notched, occurrence of noise in the notching portion 200 is prevented by the noise-proof member.

The feeding portion 250 continuously moves the electrode material S in a tractive manner in which the electrode material S with the electrode tab Sb formed thereon traveling through the notching portion 200 is continuously drawn, thereby continuously supplying the electrode material S with the electrode tab Sb formed thereon at the rear of the notching portion 200.

Figure 4B:
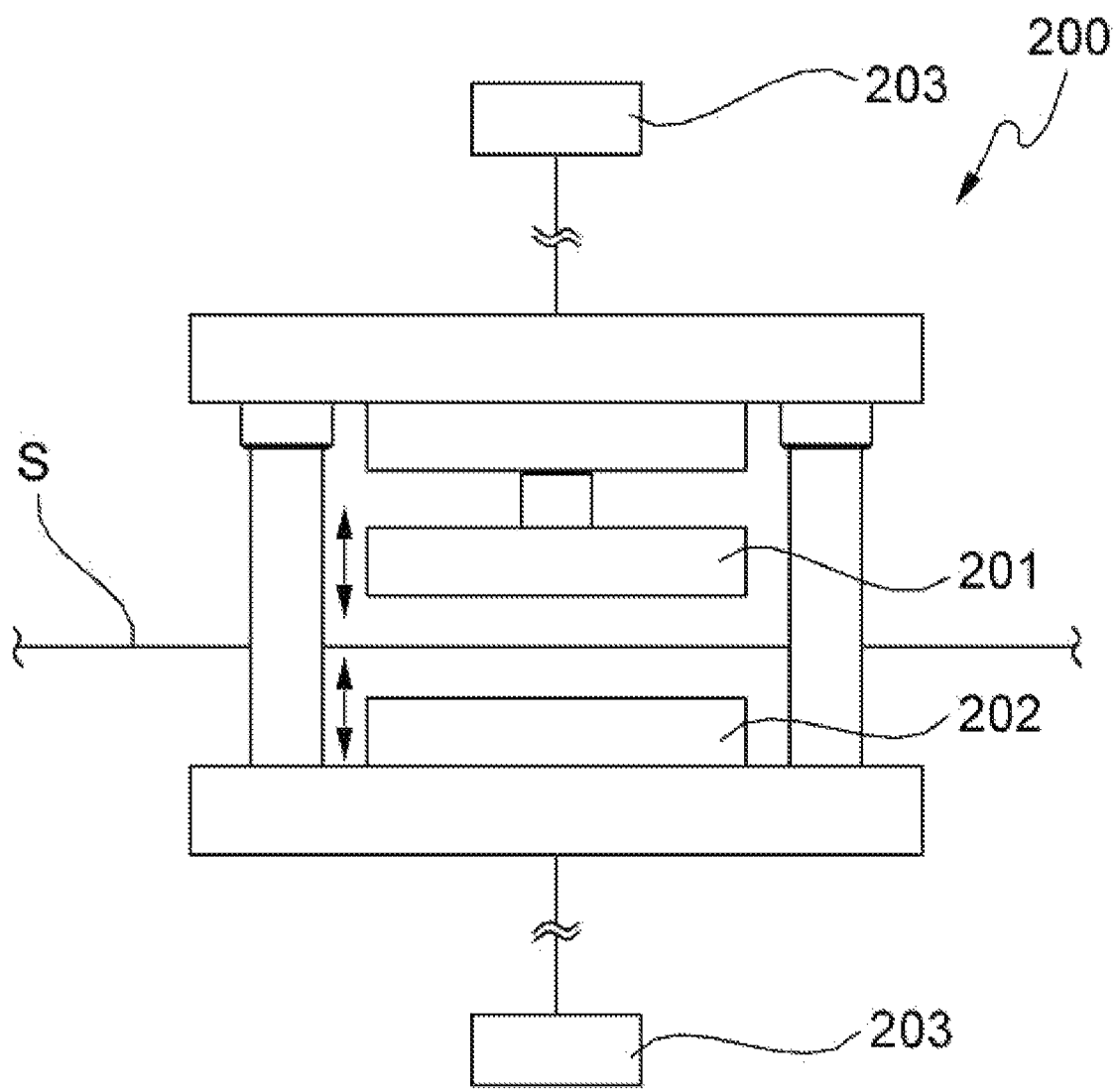
FIG. 4B is a schematic diagram illustrating a second embodiment of the notching portion shown in FIG. 1.

FIG. 4B is a schematic diagram illustrating a second embodiment of the notching portion shown in FIG. 1.

According to the second embodiment of the present invention, the notching portion 200 may include a mold upper plate 201, a mold lower plate 202, and a driving portion 203. With respect to the moving electrode material S, the mold upper plate 201 is disposed above the electrode material S and the mold lower plate 202 is disposed below the electrode material S. The mold upper plate 201 or the mold lower plate 202 may have a punching member disposed thereon. The punching member may be rectangular, L-shaped, or C-shaped. Each of the mold upper plate 201 and the mold lower plate 202 is connected to the driving portion 203. The driving portion 203 may include the servo motor 221 described with reference to FIG. 4A and a power transfer member for transferring power from the servo motor 221 to the mold upper and lower plates. The notching portion 200 may include a gripper device that presses the electrode material S when cutting the electrode material S.

In this case, the mold upper plate 201 and the mold lower plate 202 move upward and downward, respectively. When a second region S20 is aligned with the mold upper plate 201 and the mold lower plate 202, the mold upper plate 201 and the mold lower plate 202 move, or any one of the mold upper plate 201 and the mold lower plate 202 moves to form a notch N on the second region.

That is, according to the second embodiment of the present invention, the driving portion 203 is connected to each of the mold upper plate 201 and the mold lower plate 202 and includes the servo motor and the power transfer member for transferring power from the servo motor to the mold upper plate 201 and the mold lower plate 202, thereby simultaneously operating the mold upper plate 201 and the mold lower plate 202 upwards/downwards.

Figure 4C:
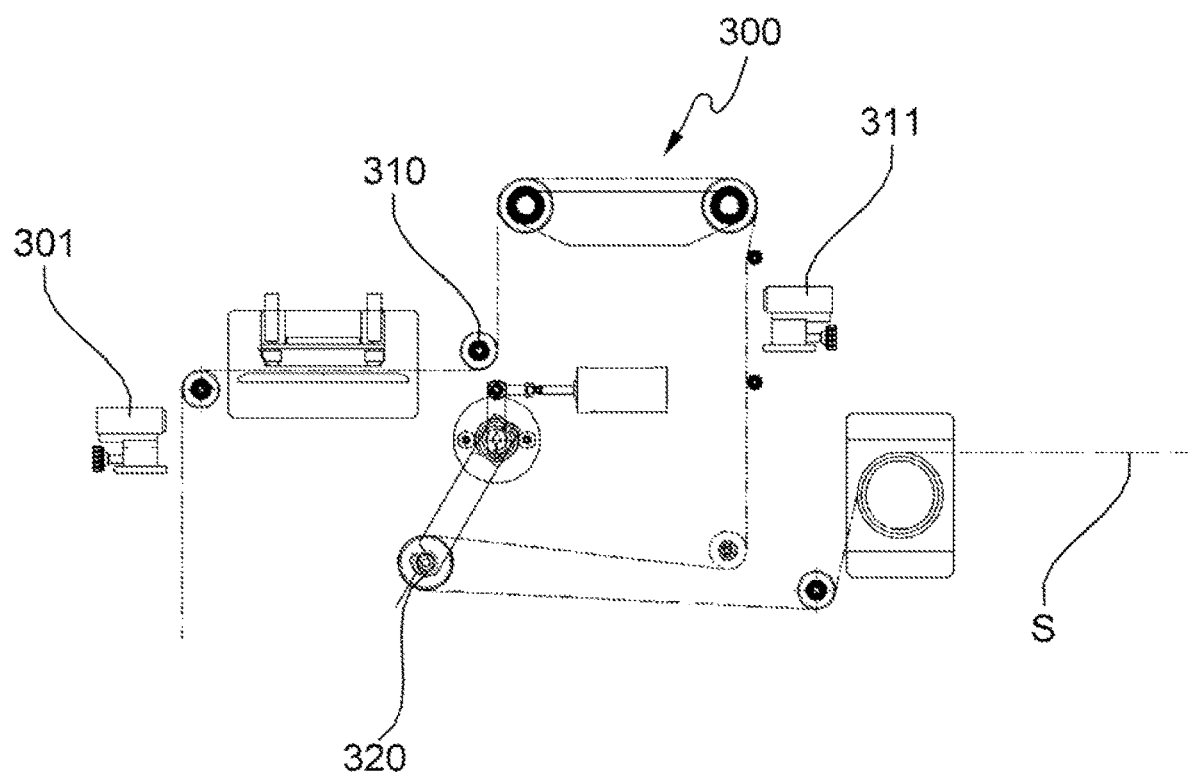
FIG. 4C is a schematic diagram illustrating a line position control (LPC) meandering control means shown in FIG. 1.

FIG. 4C is a schematic diagram illustrating a line position control (LPC) meandering control means shown in FIG. 1.

As shown in FIG. 4C, an LPC sensor 301 and an LPC meandering control means 300 are disposed, wherein the LPC sensor detects an electrode coating line (not shown) for a notching process formed on the electrode material S supplied from the unwinding portion 100 and adjusts the positions of the plurality of electrode material supply reels 101a and 101b, and the LPC meandering control means 300 aligns the position of the electrode material S so that the electrode material S moves along a predetermined path of movement.

That is, the LPC meandering control means 300 includes the LPC sensor 311 for detecting an electrode coating line for a notching process formed on the electrode material S, a plurality of guide rollers 310 for guiding the electrode material S to move in a meandering manner, and a dancer roll 320 which is moved left and right by a horizontal cylinder so as to interact with the plurality of guide rollers 310 to adjust the tension of the electrode material S. Also, the LPC meandering control means 300 adjusts the position of the guide rollers 310 to guide the electrode material (S) to move accurately along a predetermined path of movement.

At this time, in the case of a material requiring reactivity of the electrode material, the dancer roll 320 is preferably disposed at the rear end of the LPC meandering control means 300, and in the case of a material that prioritizes meandering of the electrode material, the dancer roll 320 is preferably installed at the front end of the LPC meandering control means 300.

Figure 5:
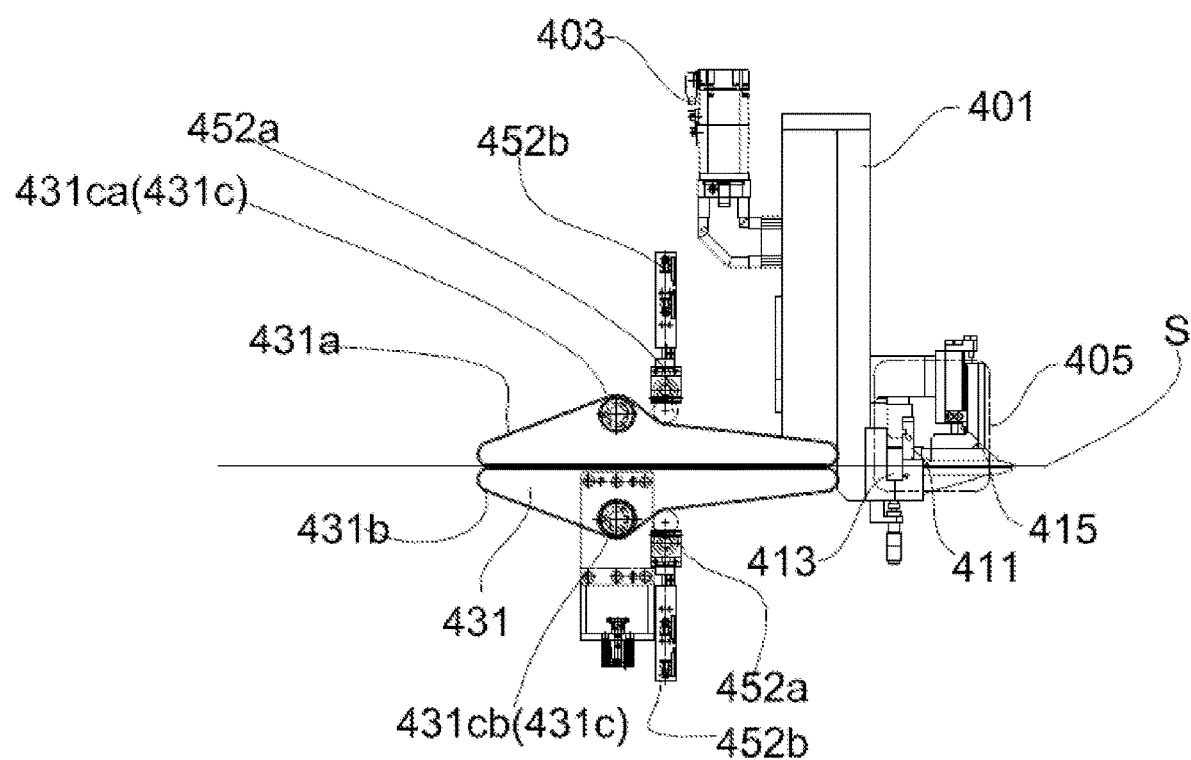
FIG. 5 is a front cross-sectional view of a cutting portion of FIG. 1.

FIG. 5 is a front cross-sectional view of the cutting portion of FIG. 1. As shown in FIGS. 1 and 5, the cutting portion 400 is provided to sequentially cut the electrode material S with the electrode tab Sb formed thereon and includes a frame 401, a servo motor 403 for a cutting portion, and a cutting member 405.

The frame 401 is formed in an L shape to support the cutting member 405 formed on one side thereof. Here, the servo motor 403 for the cutting portion is disposed on the other side of the frame 401.

The servomotor 403 for the cutting portion is fixed to the frame 401 to provide a forward or reverse rotational force of a predetermined angle for driving a cutting operation of the cutting member 405.

The cutting member 405 includes an upper cutting portion blade 411 and a lower cutting portion blade 413, which are cutting portion means for forming a secondary battery electrode by cutting the electrode material S on which the electrode tab Sb is formed, and an upper gripper 415 which presses the electrode material S during the cutting operation.

Figure 6:
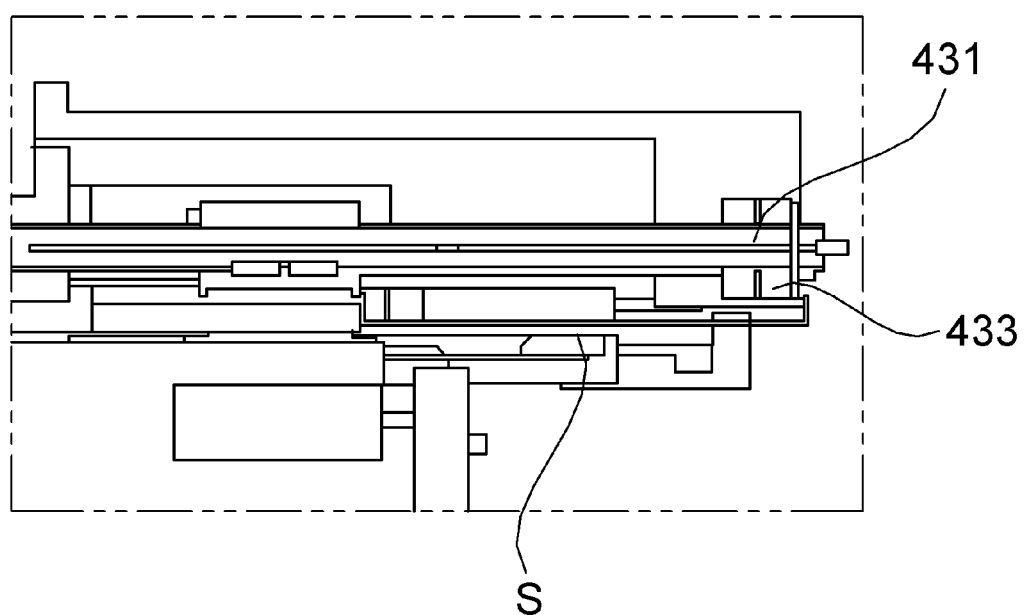
FIG. 6 is a schematic diagram illustrating a feeding conveyor electrode tab sensing member of the cutting portion of FIG. 1.
Figure 7:
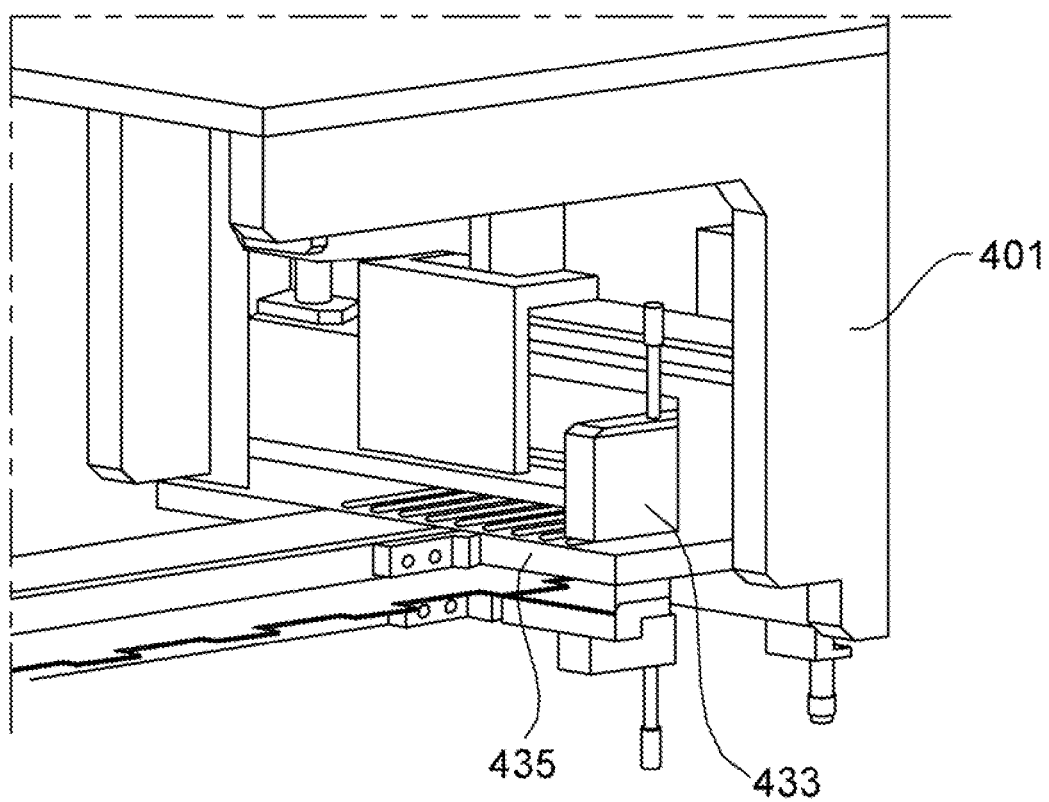
FIG. 7 is a schematic diagram illustrating an electrode tab sensing member of the cutting portion of FIG. 1.
Figure 8:
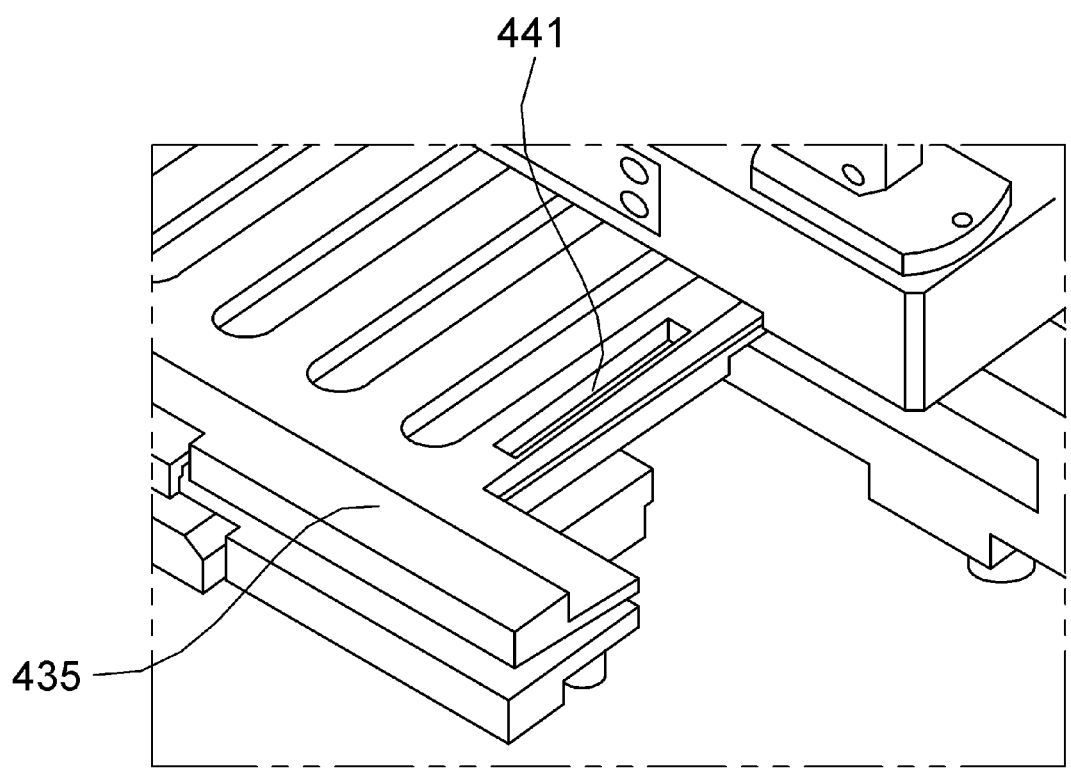
FIG. 8 is a schematic diagram showing a tab guide member of the cutting portion of FIG. 1.
Figure 9:
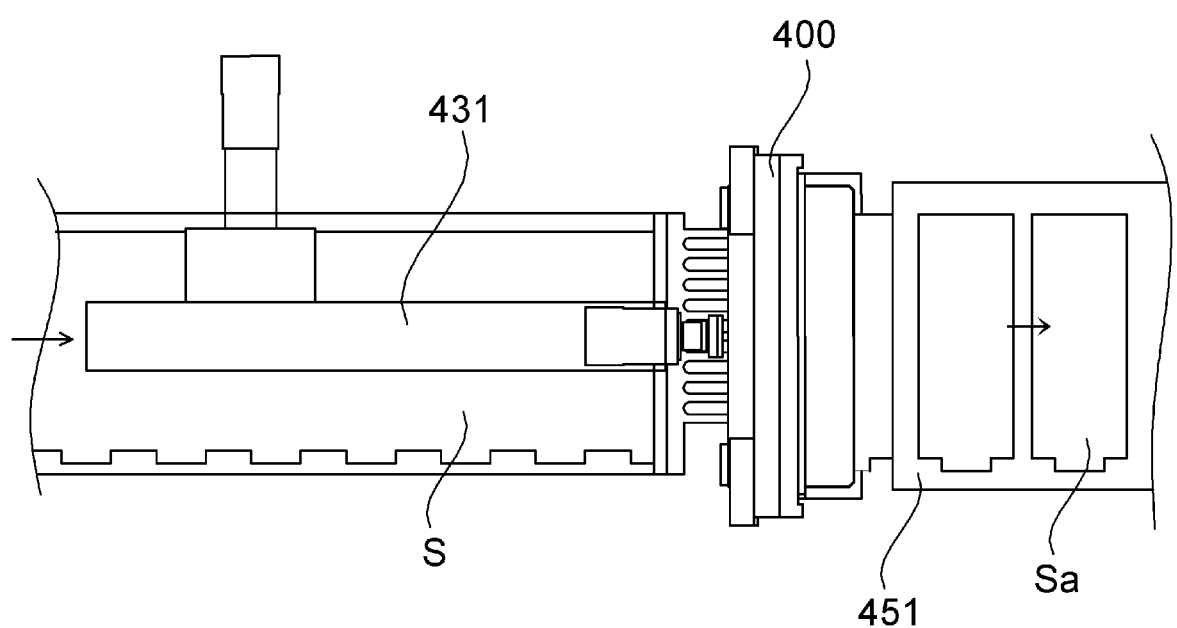
FIG. 9 is a schematic diagram illustrating a receiving conveyor of the cutting portion of FIG. 1.

FIG. 6 is a schematic diagram illustrating a feeding conveyor electrode tab sensing member of the cutting portion of FIG. 1, FIG. 7 is a schematic diagram illustrating an electrode tab sensing member of the cutting portion of FIG. 1, FIG. 8 is a schematic diagram showing a tab guide member of the cutting portion of FIG. 1, and FIG. 9 is a schematic diagram illustrating a receiving conveyor of the cutting portion of FIG. 1.

In addition, the cutting portion 400 further includes a feeding conveyor 431, an electrode tab sensing member 433, and a tab guide member 435.

As shown in FIGS. 6 to 9, the feeding conveyor 431 is disposed at the rear of the feeding unit 250, that is, at the lower front side of the frame 401 such that the electrode material S is supplied by passing through the lower portion thereof.

In addition, the feeding conveyor 431 checks a position of the electrode tab Sb according to a sensing value of the electrode tab sensing member 433 and supplies the electrode material S to the cutting member 405 at an accurate pitch. That is, the feeding conveyor 431 moves in accordance with the sensing value of the electrode tab sensing member 433 and supplies the electrode material S with the electrode tab Sb formed thereon to the cutting member 405 at a supply speed synchronized with the cutting speed of the cutting portion 400.

In addition, although not illustrated, the feeding conveyor 431 includes an upper belt capable of be raised by 9 mm to 11 mm and has a foreign matter collector installed below an upper belt drive shaft.

The feeding conveyor 431 may include a first conveyor 431a, a second conveyor 431b, and a driving roller 431c.

The first conveyor 431a is disposed above the second conveyor 431b. In addition, the second conveyor 431b is disposed below the first conveyor 431a. The first conveyor 431a and the second conveyor 431b may be disposed symmetrically with respect to the transfer direction of the electrode material S.

The electrode material S is inserted between the first conveyor 431a and the second conveyor 431b. The inserted electrode material S is transferred to the cutting member 405 through friction with the first conveyor 431a and friction with the second conveyor 431b. The driving roller 431c may include an upper driving roller 431ca and a lower driving roller 431cb. The upper driving roller 431ca is in contact with the first conveyor 431a and moves the first conveyor 431a. The lower driving roller 431cb is in contact with the second conveyor 431b and moves the second conveyor 431b. The upper driving roller 431ca and the lower driving roller 431cb may be disposed symmetrically with respect to the transfer direction of the electrode material S. Meanwhile, a separate cleaning device may be provided to clean the first conveyor 431a and the second conveyor 431b.

The cutting portion 400 may further include a tension adjusting portion 450. The tension adjusting portion 452 serves to adjust tension of the feeding conveyor 431. The tension adjusting portion 452 may include a tension roller 452a and a driving portion 452b for moving the tension roller 452a up and down. The tension adjusting portion 452 may be disposed at each of an upper portion of the first conveyor 431a and a lower portion of the second conveyor 431b. The tension roller 452a is in pressure contact with the first conveyor 431a. Here, the tension roller 452a is disposed in such a manner that it presses the first conveyor 431a from top to bottom. In addition, the other tension roller 452a is in pressure contact with the second conveyor 431b. Here, the tension roller 452a is disposed in such a manner that it presses the second conveyor 431b from top to bottom. The tension roller 452a may be a passive roller that is rotated by friction with the first conveyor 431a or the second conveyor 431b. The driving portion 452b adjusts a vertical position of the tension roller 452a so that the tension roller 452a presses the first conveyor 431a or the second conveyor 431b with a constant force.

The driving portion 452b may include a cylinder driven pneumatically, hydraulically, or by motor. When the tension of the first conveyor 431a or the second conveyor 431b is reduced, slip may occur between the first conveyor 431a and the electrode material S, or between the second conveyor 431b and the electrode material S. An operator changes the position of the tension roller 452a through the tension adjusting portion 452 when the tension of the first conveyor 431a or the second conveyor 431b is reduced. For example, when the tension roller 452 in contact with the first conveyor 431a is moved further down than before, the pressing force of the tension roller 452a to the first conveyor 431a is increased, so that the tension of the first conveyor 431a is restored. In addition, when the tension roller 452a in contact with the second conveyor 431b is moved further up than before, the pressing force of the tension roller 452a to the second conveyor 431b is increased, to that the tension of the second conveyor 431b is restored.

The tension roller 452a may be positioned between the driving roller 431c and the cutting member 405 with respect to the transfer direction of the electrode material S. In addition, the tension roller 452a may be disposed in vicinity of the driving roller 431c. The tension roller 452a that presses the first conveyor 431a and the tension roller 452a that presses the second conveyor 431b may be disposed symmetrically with respect to the transfer direction of the electrode material S.

As shown in FIGS. 6 and 7, the electrode tab sensing member 433 may be a displacement sensor that senses an edge of the electrode tab Sb formed by the notching member 200.

As shown in FIGS. 7 and 8, the tab guide member 435 guides the electrode tab Sb and has a sensing groove 441 formed therein so that there is no interference in sensing range with the electrode tab sensing member 433. In addition, the tab guide member 435 is disposed to extend to the cutting member 405 so as to prevent the occurrence of jamming in the cutting portion 400.

In addition, as shown in FIG. 9, the cutting portion 400 further includes a receiving conveyor 451 which is disposed on a lower rear side of the frame 401 and supplies the secondary battery electrode Sa produced by being cut by the cutting portion 400 to a vision inspection portion 600.

In addition, the cutting portion 400 further includes a second supply adjusting portion which is disposed at the rear of the feeding unit 250 and configured to guide the electrode material S supplied to the cutting portion 400 to move along a predetermined path of movement and adjust tension of the electrode material S.

Figure 10:
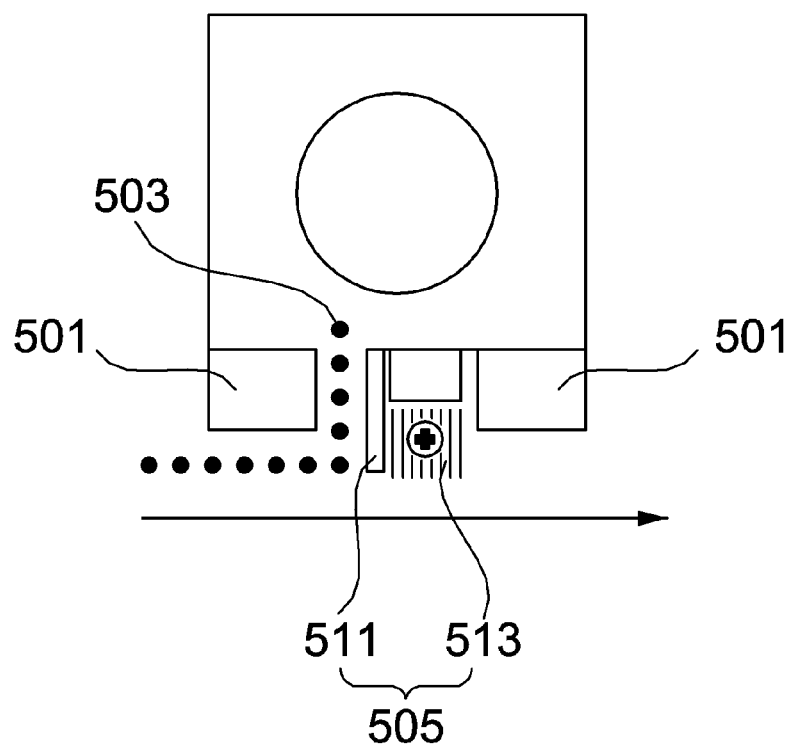
FIG. 10 is a schematic diagram illustrating a cleaning portion of FIG. 1.

FIG. 10 is a schematic diagram illustrating a cleaning portion of FIG. 1. As illustrated in FIG. 10, the cleaning portion 500 includes a static electricity preventing member 501 for discharging static electricity of the secondary battery electrode Sa, a suction member 503 for sucking in and discharging a foreign matter that is separated from the second battery electrode Sa as the static electricity is discharged by the static electricity preventing member 501, and a foreign matter-passage preventing member for preventing the passage of a foreign matter that is not sucked in and discharged by the suction member 503. Here, the foreign matter-passage preventing member 505 includes a baffle 511 and an air curtain 513.

In addition, the cleaning portion 500 configured as described above is disposed at each of the upper and lower portions of the secondary battery electrode Sa to be moved and cleans foreign matters on the upper and lower surfaces of the secondary battery electrode Sa.

The vision inspection portion 600 select electrode products with excellent quality by detecting, from an image, the quality of electrode products produced at the rear of the cutting portion 400, that is, conducting a vision inspection that photographs the appearance of the secondary battery electrode Sa produced by the cutting portion 400.

The vision inspection portion 600 includes a camera that detects the quality of the secondary battery electrode Sa from an image, and selects a secondary battery electrode Sa with excellent quality by comparing the image detected by the camera with a standard image.

In this case, when a defective electrode product is detected, the vision inspection portion 600 provides an electrical signal to a defect removal unit so that the defective electrode is separated from a suction conveyor 700 and removed to the outside. The vision inspection portion 600 corresponds to a conventional image inspection system, except that it operates in conjunction with the suction conveyor portion 700, and thus a more detailed description thereof will be omitted.

The suction conveyor portion 700 discharges the defective electrode to the outside at the rear of the vision inspection portion 600 in conjunction with the vision inspection portion 600, and moves a secondary battery electrode Sa of good quality to the subsequent process.

Figure 11:
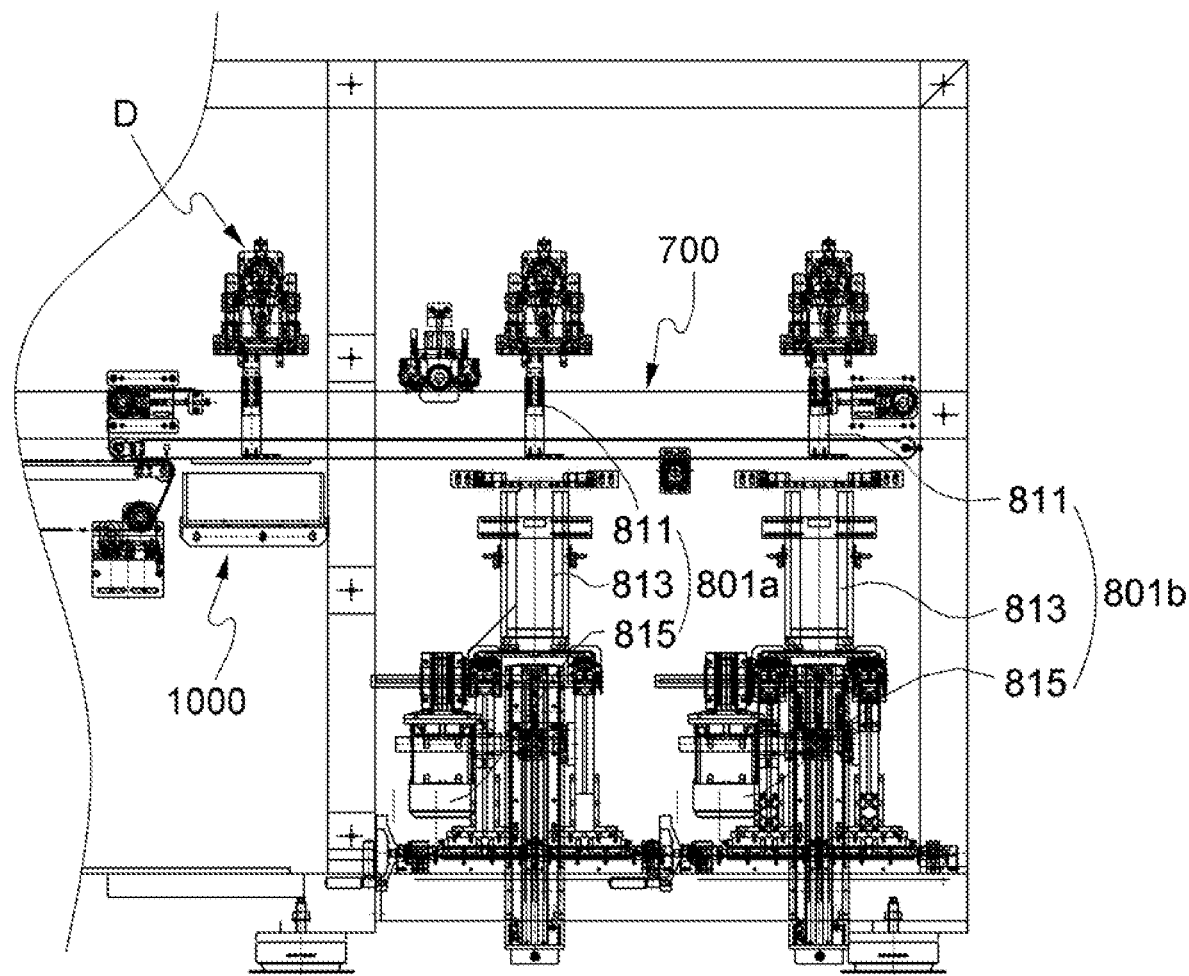
FIG. 11 is a schematic diagram illustrating an electrode discharge portion of FIG. 1.

FIG. 11 is a schematic diagram illustrating an electrode discharge portion 800 of FIG. 1. As illustrated in FIG. 11, the electrode discharge portion 800 receives the secondary battery electrodes Sa of good quality transferred from the rear of the suction conveyor portion 700 and aligns and stores them in a plurality of magazines 801.

Here, according to the inspection of the vision inspection portion 600, the defective electrode is discharged to the outside through a defective electrode tray 1000, and the secondary battery electrodes Sa of good quality are stored in the plurality of magazines 801.

In addition, the electrode discharge portion 800 cooperates with the vision inspection portion 600. Moreover, the plurality of magazines 801 include a first magazine 801a and a second magazine 801b in a two-row structure. Further, the plurality of magazines 801 may be configured as two or more magazines as necessary.

The first magazine 801a includes a push portion 811, a loading magazine 813, and a magazine conveyor 815.

The push portion 811 discharges the secondary battery electrode Sa provided from the suction conveyor portion 700 to a lower side by using cushioning, such as sponge. In this case, although not illustrated, the push portion 811 may operate according to an elevating operation of an elevator.

The loading magazine 813 is disposed on a lower side of the suction conveyor portion 700 and the secondary battery electrodes Sa of good quality discharged to the lower side by the push portion 811 are loaded into the loading magazine 813.

The magazine conveyor 815 is disposed below the suction conveyor portion 700, and if necessary, transfers the loading magazine 1160 in a direction perpendicular to the operation direction of the suction conveyor portion 700, i.e., the supply direction of the secondary battery electrodes Sa of good quality.

In describing the second magazine 801b, the configuration thereof is substantially the same as that of the first magazine 801a, and hence a description of the configuration of the second magazine 801b will be omitted. In addition, effects and advantages of the second magazine 801b may be substantially the same as those of the first magazine 801a.

At this time, in the electrode discharge portion 800, the secondary battery electrodes Sa of good quality are loaded into the loading magazine 813 of the first magazine 801a that is moved by the magazine conveyor 815 to a position where the secondary battery electrodes Sa of good quality discharged to the lower side by the push portion 811 can be loaded, and the second magazine 801b is on standby.

Thereafter, in the electrode discharge portion 800, when a predetermined number of secondary battery electrodes of good quality are loaded into the loading magazine 813 of the first magazine 801a, that is, when the loading in the loading magazine 813 of the first magazine 801a is complete, the loading magazine 813 of the second magazine 801b is moved by the magazine conveyor 815 to a position where the secondary battery electrodes Sa of good quality discharged to the lower side by the push portion 811 can be loaded and the loading magazine 813 of the first magazine 801a is moved by the magazine conveyor 815 to a position where the magazine can be replaced, such that the first and second magazines 801a and 801b are automatically replaced with each other in order to store the secondary battery electrodes Sa of good quality without interrupting production of the secondary battery electrodes. In this case, the first magazine 801a into which the electrodes are completely loaded is moved to a position where the magazine can be replaced, then separates the magazine in which the electrodes are completely loaded, and is provided with a new magazine as a loading magazine 813.

At this time, the secondary battery electrodes Sa of good quality are continuously loaded into the loading magazine 813 of the second magazine 801b, the magazine of the first magazine 801a in which the loading of the secondary battery electrodes has been complete is replaced with the new magazine, and the first magazine 801a is on standby at the magazine replacement position.

That is, the secondary battery electrode production system according to the embodiment includes the electrode discharge portion having a plurality of magazines, such as the first and second magazines in a two-row structure, whereby the plurality of magazines are automatically replaced with each other so that the secondary battery electrodes of good quality are loaded and stored without interrupting the production process of the secondary battery electrodes during the magazine replacement process in which the magazine in which the secondary battery electrodes are completely loaded is separated from the electrode discharge portion and is replaced with a new magazine. Therefore, it is possible to produce secondary battery electrodes at a higher speed than in the prior art in which the electrode discharge portion is provided with a single magazine and hence the production process of the secondary battery electrodes is stopped when the magazine is replaced.

As described above, the present invention has an effect of providing a secondary battery electrode production system capable of improving productivity by operating a mold in an upward and downward manner during a notching process and including an electrode discharge unit having a plurality of magazines.

In addition, in the present invention, in the case of a material requiring reactivity of an electrode material, a dancer roll is disposed at the rear end of the LPC meandering control means, and in the case of a material that prioritizes the meandering of the electrode material, the dancer roll is installed at the front end of the LPC meandering control means. Thus, there is an effect of increasing productivity by actively dealing with each electrode material.

Further, in the present invention, an electrode discharge portion having a plurality of magazines is included, whereby the production process of secondary battery electrodes is prevented from being interrupted during the replacement of magazine, and thus it is possible to produce secondary battery electrodes at high speed.

In the above, specific examples of the secondary battery electrode production system of the present invention have been described, but it is obvious that various implementation modifications are possible within the limit not departing from the scope of the present invention.

Therefore, the scope of the present invention should not be limited to the aforementioned embodiments, but should be defined by the equivalents to the appended claims as well as the claims.

Accordingly, it should be understood that the above-described embodiments are merely exemplary and is not limited, and it should be interpreted that the scope of the present invention is represented by the claims rather than the description, and the changes or modifications derived from the claims and the equivalents thereof pertain to the scope of the present invention.

What is claimed is:

1. A secondary battery electrode production system for producing a secondary battery electrode, the secondary battery electrode production system comprising:
   an unwinding portion having multiple electrode material supply reels so as to continuously supply an electrode material;
   a notching portion disposed on a path of movement of the electrode material supplied from the unwinding portion;
   a cutting portion disposed on the path of movement of the electrode material supplied from the notching portion so as to generate the electrode;
   a vision inspection portion for confirming whether the electrode is acceptable or not; and
   an electrode discharge portion comprising a magazine for aligning and storing the electrode while interworking with the vision inspection portion,
   wherein the notching portion comprises:
   a mold upper plate disposed above the electrode material;
   a mold lower plate disposed below the electrode material; and
   a driving portion connected to the mold upper plate and the mold lower plate, respectively, the driving portion comprising a servomotor and a power transfer member for transferring power from the servomotor to the mold upper plate and the mold lower plate, thereby simultaneously operating the mold upper plate and the mold lower plate upwards/downwards, and accordingly, an electrode tab can be formed by notching the electrode material,
   wherein the electrode discharge portion has a plurality of magazines for aligning and storing the acceptable secondary battery electrodes while interworking with the vision inspection portion and the plurality of magazines are automatically replaced with each other to store the acceptable electrodes without stopping the electrode production system, and
   wherein the plurality of magazines constituting the electrode discharge portion comprises a first magazine and a second magazine in a two-row structure, and each of the first and second magazines comprises a push portion for discharging the acceptable secondary battery electrode determined and supplied by the vision inspection portion to a lower side; a loading magazine in which the acceptable electrode discharged by the push portion is loaded; and a magazine conveyor for transferring the loading magazine in a direction perpendicular to a supply direction of the acceptable electrode.

2. The secondary battery electrode production system of claim 1, wherein a line position control (LPC) sensor for detecting an electrode coating line for a notching process formed on the electrode material supplied from the unwinding portion is provided to adjust positions of the multiple electrode material supply reels.

3. The secondary battery electrode production system of claim 2, comprising an LPC meandering control means for detecting the electrode coating line for a notching process formed on the electrode material supplied from the unwinding portion and an edge of the electrode tab formed by the notching portion, thereby allowing the electrode material to move along the path of movement.

4. The secondary battery electrode production system of claim 3, wherein the LPC meandering control means comprises the LPC sensor disposed between the unwinding portion and the notching portion and configured to detect the electrode coating line for a notching process formed on the electrode material supplied from the unwinding portion, a plurality of guide rollers for guiding the electrode material to move along the path of movement, and a dancer roll which is moved left and right by a horizontal cylinder so as to interact with the plurality of guide rollers to adjust tension of the electrode material.

5. The secondary battery electrode production system of claim 4, wherein, when the dancer roll is moved by an operation of the horizontal cylinder and thus a distance between the dancer roll and the plurality of guide rollers is adjusted, a distance the electrode material travels through the plurality of guide rollers is adjusted, thereby controlling the tension of the electrode material continuously supplied.

6. The secondary battery electrode production system of claim 1, wherein, in the electrode discharge portion, a predetermined number of the acceptable secondary battery electrodes are loaded into the loading magazine of the first magazine that is moved by the magazine conveyor to a position where the acceptable secondary battery electrodes discharged to the lower side by the push portion can be loaded, and when a predetermined number of the acceptable electrodes are loaded into the loading magazine of the first magazine in a state where the second magazine is on standby, the second magazine is moved by the magazine conveyor to a position where the acceptable electrodes discharged to the lower side by the push portion can be loaded and the first magazine is moved by the magazine conveyor to a position where the corresponding loading magazine is replaced with a new magazine, such that the first and second magazines are automatically replaced with each other in order to store the acceptable electrodes without interrupting production of the secondary battery electrodes, and thereby the acceptable electrodes are loaded into a corresponding loading magazine of the second magazine and the first magazine is provided with the new magazine and is on standby.

* * * * *